US008775460B2

(12) United States Patent
Auvenshine et al.

(10) Patent No.: US 8,775,460 B2
(45) Date of Patent: Jul. 8, 2014

(54) MANAGING CHANGES TO COMPUTER SYSTEM

(75) Inventors: John J. Auvenshine, Tucson, AZ (US); Justin C. Blackburn, Surprise, AZ (US); Nicolas E. Fosdick, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 11/296,912

(22) Filed: Dec. 8, 2005

(65) Prior Publication Data
US 2007/0136242 A1    Jun. 14, 2007

(51) Int. Cl.
*G06F 17/30* (2006.01)

(52) U.S. Cl.
USPC .......................... 707/769; 709/203; 709/219

(58) Field of Classification Search
CPC combination set(s) only.
See application file for complete search history.

(56) References Cited

U.S. PATENT DOCUMENTS

| | | | | |
|---|---|---|---|---|
| 5,920,867 | A | | 7/1999 | Van Huben et al. .......... 707/101 |
| 5,960,439 | A | * | 9/1999 | Hamner et al. ...................... 1/1 |
| H0001897 | H | * | 10/2000 | Fletcher et al. .............. 455/433 |
| H1897 | H | * | 10/2000 | Fletcher et al. .............. 455/433 |
| 6,167,358 | A | * | 12/2000 | Othmer et al. ................ 702/188 |
| 6,237,092 | B1 | * | 5/2001 | Hayes, Jr. ...................... 713/100 |
| 6,345,288 | B1 | * | 2/2002 | Reed et al. .................... 709/201 |
| 6,411,966 | B1 | * | 6/2002 | Kwan et al. ........................... 1/1 |
| 7,188,126 | B2 | | 3/2007 | Murata et al. |
| 7,281,012 | B2 | * | 10/2007 | Galchev ................................ 1/1 |
| 2003/0191773 | A1 | * | 10/2003 | Alexander .................... 707/102 |
| 2003/0200304 | A1 | * | 10/2003 | Thorpe et al. ................. 709/224 |
| 2003/0229686 | A1 | | 12/2003 | Kortright ....................... 709/220 |
| 2004/0054770 | A1 | * | 3/2004 | Touboul ........................ 709/223 |
| 2004/0060044 | A1 | * | 3/2004 | Das et al. ...................... 717/171 |
| 2004/0128370 | A1 | * | 7/2004 | Kortright ....................... 709/221 |
| 2004/0255291 | A1 | | 12/2004 | Sierer et al. ................... 717/174 |
| 2005/0198247 | A1 | * | 9/2005 | Perry et al. .................... 709/223 |

* cited by examiner

*Primary Examiner* — Shyue Jiunn Hwa
(74) *Attorney, Agent, or Firm* — Yee & Associates, P.C.; Arthur J. Samodovitz (57) ABSTRACT

Automated system, method and program for managing a change to a computer program. One or more servers which the changed computer program accesses or uses to perform one or more functions are determined. One or more other computer programs in one or more other servers which access the one or more servers are determined. People responsible for the one or more servers and the one or more other computer programs and/or the one or more other servers that the changed computer program has been changed are notified. Another automated system, method and program for managing a change to a computer program is disclosed. One or more servers which the changed computer program accesses are determined by automatically querying configuration files of the changed computer program. People responsible for the one or more servers are notified that the changed computer program has been changed.

16 Claims, 6 Drawing Sheets

FIG. 6

MANAGING CHANGES TO COMPUTER SYSTEM

FIELD OF THE INVENTION

The present invention relates generally to computer systems, and more specifically to management of changes to computer systems.

BACKGROUND OF THE INVENTION

Computer programs within computers are often updated, replaced or otherwise changed. The change may impact other computer programs within the same computer or another computer. For example, a server may manage a database in storage, and contain a database management program. Multiple applications, such as web applications, on the same or different servers may need to access the database for web pages, files or other data. To obtain such data, the web application will typically make a request to the database management program for the data. In response, the database management program will access the requested data from storage, and furnish it to the requesting web application. Some types of changes to the web application may impact the database management server. For example, if a new user function is added to the web application that will result in more searching through the database management server, this will burden the database management server. This will slow response time to other applications in obtaining data from the database manager server. Consequently, some types of changes to web and other types of applications that access a database management server will impact other applications that access the same database management server.

It was known to manually enter a list of people that should be notified when there is a change to a respective computer programs or server. When a change is made to such a computer program or server, it was known to automatically notify the people in the list of the change. Then, the people in the list can determine if any other changes need to be made to any other applications or servers, and if so, make the change.

It was also known to automatically identify users of a computer program, such as a Samba program (i.e. an open source utility) in a server, from a list of valid userIDs. When a change is made to such a computer program, it was known to automatically notify the users of the change, and provide any software updates to corresponding user/client portions of such computer programs or other instructions needed to continue to use the Samba program.

While the foregoing techniques are effective, they require too much manual effort and/or tend to identify "owners" of servers and computer programs which are not really affected by a change to another computer program. Also, it is difficult to keeping the list of owners synchronized with the list of servers in a system environment characterized by ongoing change and adjustment.

An object of the present invention is to manage changes to a computer program or server by targeting the number of people who are notified of changes to the computer program or server.

Another object of the present invention is to ensure that the correct people are notified of changes, and eliminate human error in the notification process.

Another object of the present invention is to provide the foregoing change management in a substantially automated manner.

SUMMARY OF THE INVENTION

The present invention resides in an automated system, method and program for managing a change to a computer program. One or more servers which the changed computer program accesses or uses to perform one or more functions are determined. One or more other computer programs in one or more other servers which access the one or more servers are determined. People responsible for the one or more servers and the one or more other computer programs and/or the one or more other servers that the changed computer program has been changed are notified.

The present invention also resides in an automated system, method and program for managing a change to a computer program. One or more servers which the changed computer program accesses are determined by automatically querying configuration files of the changed computer program. People responsible for the one or more servers are notified that the changed computer program has been changed.

DETAILED DESCRIPTION OF THE PREFERRED EMBODIMENTS

Figure 1:
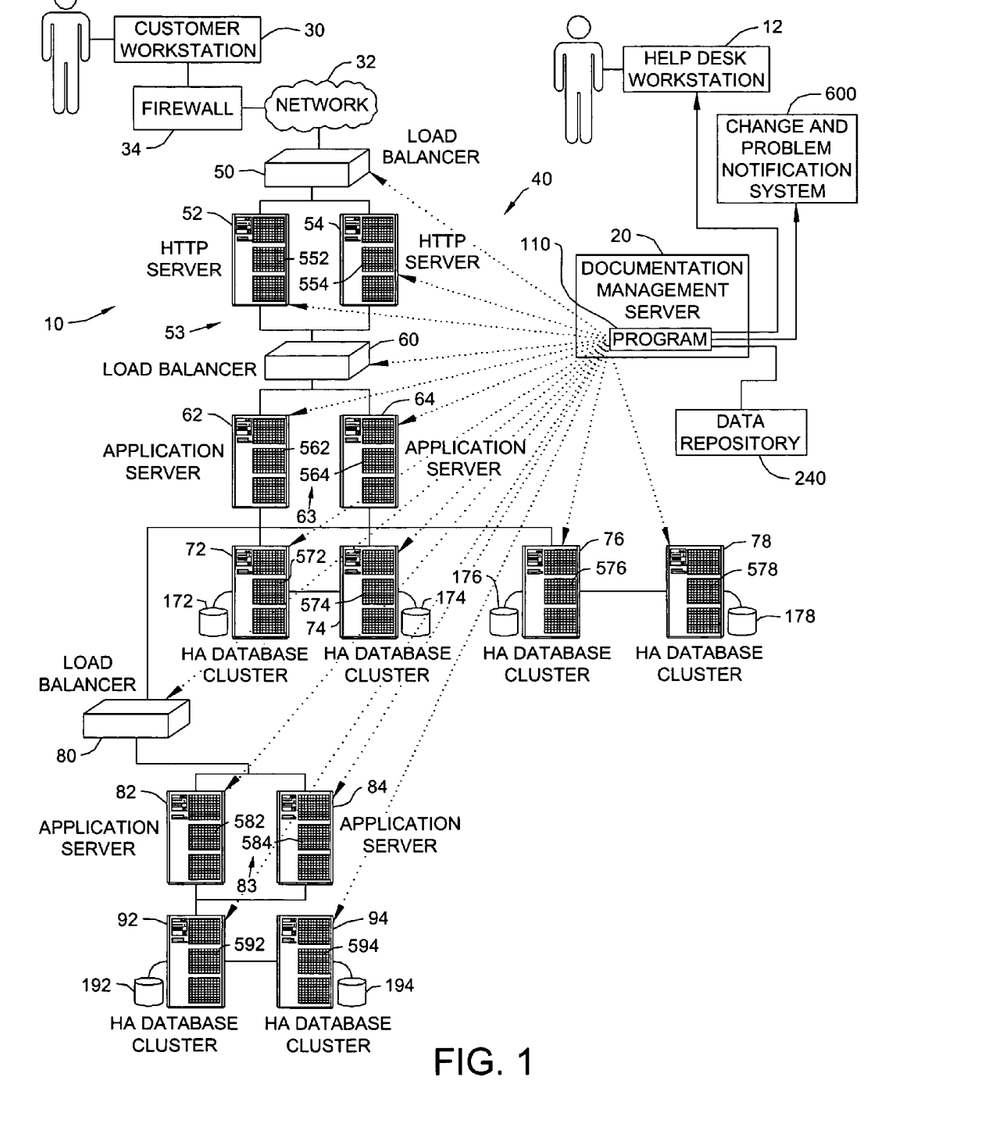
FIG. 1 is a block diagram of a distributed computer system including a documentation management server and a change and problem notification system in which the present invention is incorporated.

The present, invention will now be described in detail with reference to the figures. FIG. 1 illustrates a distributed computer system generally designated 10, a help desk workstation 12, a documentation management server 20 and a change and problem notification system 600 according to the present invention. Distributed computer system 10 comprises a customer workstation 30 coupled by a network 32 and an optional firewall 34 to a distributed server system 40. The network 32 can be an intranet, the Internet or an extranet, and can use a variety of network protocols such as TCP/IP or SNA. The distributed server system 40 can take various forms and have various architectures with varying numbers, arrangements and layers of servers, such as the that illustrated in FIG. 1. In FIG. 1, requests from client workstation 30 for an application are forwarded via the network 32 to a load balancer 50 for a cluster 53 of servers. Load balancer 50 then selects server 52 or 54 within the cluster 53 to handle the request, based on their availability or other known load balancing criteria. By way of example, servers 52 and 54 are web servers, i.e. handle requests via the Internet for applications represented by web pages However, in another embodiment of the distributed server system 40, the client requests are forwarded directly to a single web (or other type of) server such as server 52 (and there is no load balancer 50 or server 54). In the embodiment illustrated in FIG. 1, the application requested by the client workstation 30 does not reside on server 52 (or 54). So server 52 determines, based on an internal configuration file, the IP address of another server or server cluster that contains the requested application. Server 52 also includes a program used to communicate with this other server or cluster. In the embodiment illustrated in FIG. 1, server 52 forwards the customer request to a load balancer 60 for a cluster 63 of application servers. Load balancer 60 then selects one application server 62 or 64 in cluster 63, such as server 62, to handle the request, based on their availability or other known load balancing criteria. However, in another embodiment of the distributed server system 40, the client requests are forwarded directly from server 52 to a single application server such as server 62 (and there is no load balancer 60 or server 64).

In the embodiment illustrated in FIG. 1, each of the application servers 62 and 64 comprises a middleware program in addition to the actual application requested by the client workstation 30. The middleware program is responsible for managing differences in format and protocol, if any, between the client request and the requested application. The application on server 62 is responsible for obtaining the data pertaining to the customer request and performing any computations pertaining to the customer request. In the illustrated embodiment, the application on server 62 can obtain the data from backend database servers 72, 74 or 76. Each backend database server 72, 74 and 76 obtains the requested data from one or more data repositories, such as respective disk storages 172, 174 and 176. In high availability environments, there will ordinarily be a backup (backend) database server in case the primary (backend) database server fails. In the illustrated embodiment, backend database servers 72 and 74 can perform this backup role for each other, and a backend database server 78 with backend database storage 178 backs-up database server 76. In some cases, the application on server 62 generates a web page or other screen to send to the client workstation based on the data which it obtains. The web page or other screen permits the customer to interactively use the application. In other cases, the middleware program on server 62 or 64 generates the web page or other screen for display on client workstation 30, based on data supplied by the application. In both cases, the application generally needs to obtain data from one of the database servers 72, 74 or 76. In the case of a web server, the data may be a web page itself.

In many cases such as illustrated in FIG. 1, a single application executing on server 62 (or 64) is able to handle the customer request by directly querying backend database servers 72, 74 or 76, for the requisite data (and then processing the data if needed). However; in other cases also illustrated in FIG. 1, the single application on server 62 cannot alone handle the customer request, even with data from backend database server 72, 74 or 76. For example, if the customer request requires two different services such as one to list homes for sale and another to process a mortgage request, two different applications may be required, one to display the list of the homes for sale and manage the interface to the customer, and the other application to process the mortgage request. In such a case, the application in server 62 may supply one of the services (and obtain the data for that service from backend database server 72, 74 or 76), but may need to query another server or server cluster for the other application to process the mortgage request (and obtain the data for that service from another backend database. In the illustrated embodiment, this other cluster 83 of servers comprises a load balancer 80 and application servers 82 and 84. Each of the application servers 82 and 84 comprises the second (for example, mortgage) application as noted above which accesses database server 92 or 94 for the requisite data. Each of the application servers 82 and 84 also comprises middleware if necessary to interface to the format and protocol of the client request and format a web page or other screen for display at the client workstation. Each backend database server 92 and 94 accesses one or more data repositories, such as respective disk storages 192 and 194. In high availability environments, there will ordinarily be a backup (backend) database server in case the primary (backend) database server fails. In the illustrated embodiment, backend database servers 92 and 94 can perform this backup role for each other. The foregoing features of server system 40 were known in the industry.

"Agent" programs 552, 554, 562, 564, 572, 574, 576, 578, 582, 584, 584, 592 and 594 run on the web servers, application/middleware servers and database servers 52, 54, 62, 64, 72, 74, 76, 78, 82, 84, 92 and 94, respectively within server system 40 to automatically gather configuration and other information about the respective servers and supply the information to server 20. If the load balancers 50, 60 and 80 are capable or running agent programs (for example, have operating systems capable or running agent programs), then respective agent programs run on the load balancers 50, 60 and 80 as well. In the illustrated embodiment, agent programs 550, 560 and 580 run on load balancers 50, 60 and 80. However, in an alternate embodiment, one or more of the load balancers 50, 60 or 80 do not include agent programs. (Agent programs that can gather data in a server were known in the art, but have been customized according to the present invention to gather configuration and other information needed to implement the present invention.) A documentation generation program 110 runs on server 20, receives the configuration and other information supplied by agent programs 550, 552, 554, 560, 562, 564, 572, 574, 576, 578, 580, 582, 584, 592 and 594, and automatically generates application support documentation and data to assist the help desk people troubleshoot and correct customer problems with server system 40. The documentation generation program 110 and agent programs 550, 552, 554, 560, 562, 564, 572, 574, 576, 578, 580, 582, 584, 592 and 594 are further described below with reference to FIGS. 2 and 3.

Figure 2:
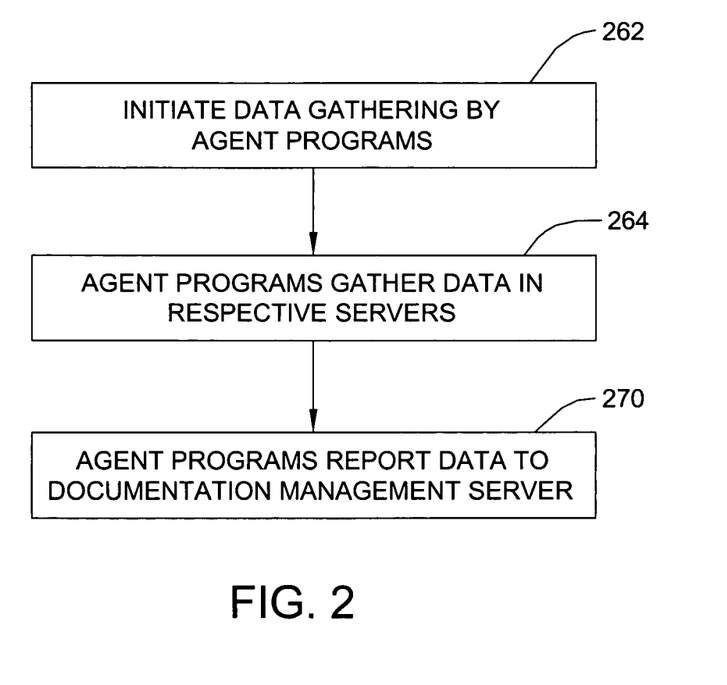
FIG. 2 is a flow chart of a documentation generation program and agent programs within the distributed computer system of FIG. 1.

FIG. 2 illustrates the overall operation of documentation generation program 110 and agent programs 550, 552, 554, 560, 562, 564, 572, 574, 576, 578, 580, 582, 584, 592, and 594. In step 262, the data gathering by the agent programs 550, 552, 554, 560, 562, 564, 572, 574, 576, 578, 580, 582, 584, 592 and 594 within server system 40 is initiated. In some cases, program 110 periodically sends requests to agent programs 550, 552, 554, 560, 562, 564, 572, 574, 576, 578, 580, 582, 584, 592 and 594 to gather the configuration and other data from their respective servers. In other cases, the agent programs 550, 552, 554, 560, 562, 564, 572, 574, 576, 578, 580, 582, 584, 592 and 594 initiate their own data gathering activity, either based on their own predetermined schedule or based on occurrence of events or significant changes, such as changes to configuration in their respective servers. In step 264, agent programs 550, 552, 554, 560, 562, 564, 572, 574, 576, 578, 580, 582, 584, 592 and 594 begin the actual data gathering in their respective servers. By way of example, agent programs 550, 552, 554, 560, 562, 564, 572, 574, 576, 578, 580, 582, 584, 592 and 594 comprise script programs which execute on their respective servers to solicit or read configuration and other information from the operating systems and configuration files within their respective servers. Then, agent programs 550, 552, 554, 560, 562, 564, 572, 574, 576, 578, 580, 582, 584, 592 and 594 report the information to program 110 in documentation management server 20. For example, agent programs 550, 552, 554, 560, 562, 564, 572, 574, 576, 578, 580, 582, 584, 592 and 594 may gather configuration information from Apache httpd.conf configuration file and IBM Websphere adminlconfig configuration file.

For each of the web servers 52 and 54, these configuration files contain the following types of information: (a) a list of the URLs that lead to/reside on the web server, and for each of these URLs (i) when the requested application resides on another, application/middleware server, an identification of this other application/middleware server (by IP address and virtual host), or (ii) when the requested application resides on the web server, a reference to static data files that contain requested information for the application, or (iii) when the requested function can be performed by a scripting file (for example, "CGI" script files) on the web server, and a pointer to the scripting file.

For each of the application/middleware servers 62, 64, 82 and 84, these configuration files contain the following types of information: (a) a list of the URLs that lead to/reside on this web server, and for each of these URLs (i) when the requested application resides on another, application/middleware server, an identification of the application/middleware server (by IP address and virtual host), or (ii) when the requested application resides on the web server, a reference to static data files that contain requested information for the application, or (iii) when the requested function can be performed by a scripting file (for example, "CGI" or java script files) on the web server, a pointer to the scripting file and (b) for each virtual host in the application/middleware server, (i) an identity (by IP address and database instance or port) of the connection to the backend database server(s) accessed by the virtual host, (ii) identities of other application servers that run the same application, (iii) identities of other application servers that access the same database, if known, and (iv) identities of applications in other servers that access applications and/or data managed by the server.

For each of the database servers 72, 74, 76, 78, 92 and 94, these configuration files also contain the following types of information: (a) list of ports used to connect the database server to the application servers which access the database server, (b) list of ports on the database server which are used to connect the database server to each database or "database instance" (on disk) accessed by the database server, (c) password used by each application to access each database instance via the database server.

For each of the load balancing servers 50, 60 and 80, these configuration files also contain the following types of information: (a) list of IP addresses for servers in the cluster that the load balancer balances, (b) list of ports used by the load balancing server for each of the servers in the cluster.

The agent programs gather the foregoing information from the configuration files in their respective servers, and report this information to server 20. The data gathering by the agent programs in step 264 is described below in more detail with reference to FIG. 3.

After receiving the data from agent programs 550, 552, 554, 560, 562, 564, 572, 574, 576, 578, 580, 582, 584, 592 and 594, documentation generation program 110 enters the data into a document management file/database 240 (step 270).

Figure 3:
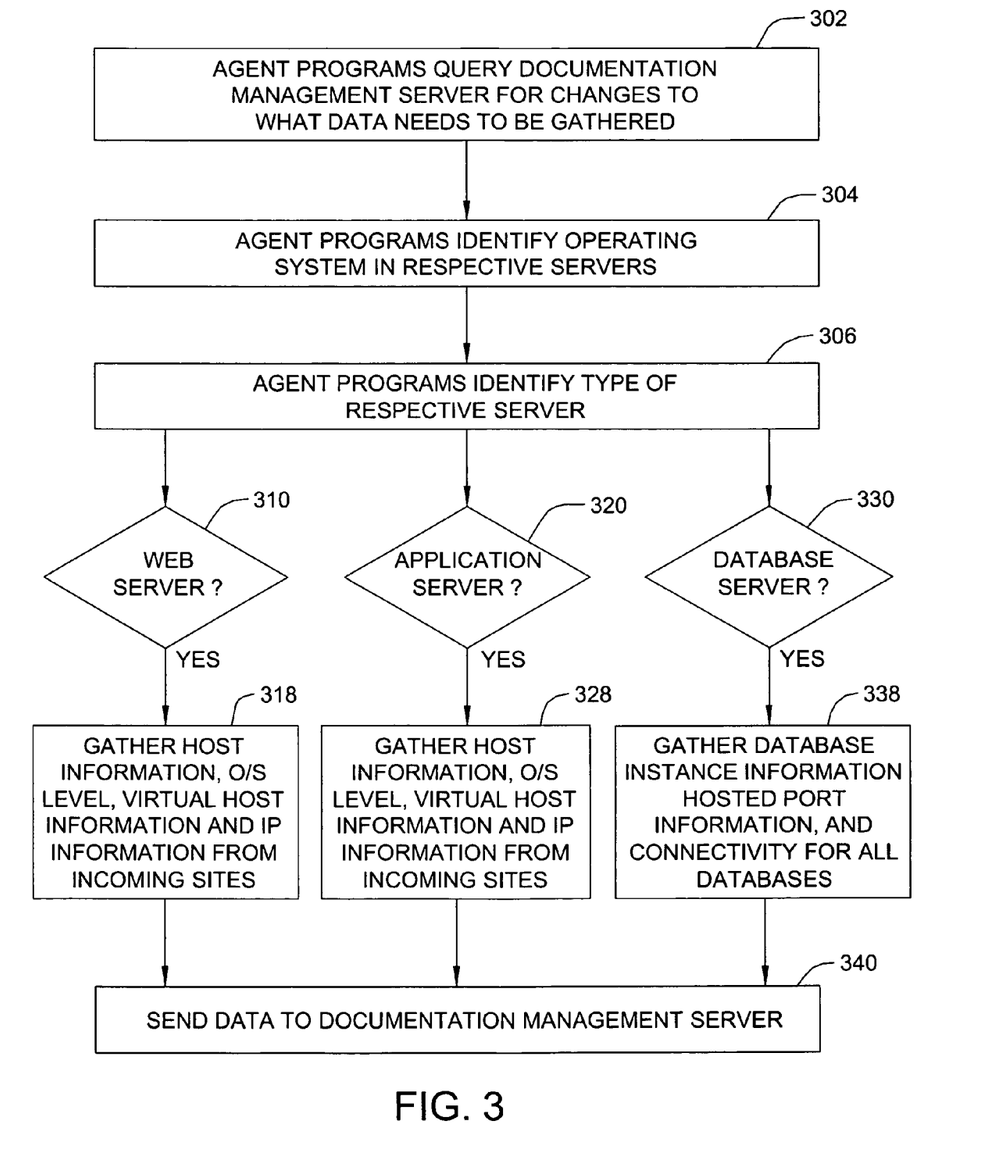
FIG. 3 is a flow chart of the agent programs of FIG. 2.

FIG. 3 illustrates step 264 in more detail, where agent programs 550, 552, 554, 560, 562, 564, 572, 574, 576, 578, 580, 582, 584, 592 and 594 execute and gather configuration and other data within their respective servers, and report the data to program 110 in documentation management server 20. In the illustrated embodiment, each of the agent programs 550, 552, 554, 560, 562, 564, 572, 574, 576, 578, 580, 582, 584, 592 and 594 is a script program, i.e. a programmed series of commands that simulate and automate manual commands entered by an operator at the respective server. In step 302, agent programs 550, 552, 554, 560, 562, 564, 572, 574, 576, 578, 580, 582, 584, 592 and 594 query program 110 for any changes in the types of configuration or other information needed by program 110. If there are such changes, then program 110 downloads a respective update to agent programs 550, 552, 554, 560, 562, 564, 572, 574, 576, 578, 580, 582, 584, 592 and 594. The update can be an update to script program within the agent program or an update to parameters within the script program. Next, agent programs 550, 552, 554, 560, 562, 564, 572, 574, 576, 578, 580, 582, 584, 592 and 594 determine the type of operating system within their respective server (step 304). Agent programs 550, 552, 554, 560, 562, 564, 572, 574, 576, 578, 580, 582, 584, 592 and 594 determine the type of operating system in their respective server by querying a known data gathering program function associated with the operating system. This data gathering function queries a file within the respective server which identifies the operating system. For example, in the AIX operating system, this known data gathering function is called "oslevel-1" or "lslpp-1" for specific OS components.

Next, agent programs 550, 552, 554, 560, 562, 564, 572, 574, 576, 578, 580, 582, 584, 592 and 594 determine the type of their server, i.e. http, application, database, etc. and when applicable, the type of database server (step 306). Agent programs 550, 552, 554, 560, 562, 564, 572, 574, 576, 578, 580, 582, 584, 592 and 594 determine the type of their server by searching for files (typically in standard locations) indicative of the type of server. For example, an IBM Websphere web server contains a WebSphere binary file, and the agent program will search for this binary file. If the agent program locates this WebSphere binary file, the agent program knows that the server is a web server. As another example, an application server may include Apache configuration files, and the agent program will search for the Apache configuration files. If the agent program locates the Apache configuration file, the agent program knows that the server is an application server. As another example, a database server (such as Oracle database, IBM DB2 database, etc.) typically contains a database binary file, and the agent program will search for this binary file. If the agent program locates this database binary file, the agent program knows that the server is a database server.

If the server being queried by the respective agent program is a web server (decision 310), then the agent program gathers the following server information: operating system level, virtual host information (i.e. name of all applications within the server, IP address for each application, directories for web pages associated with the application), IP addresses for URLs for applications within the server that are addressed by incoming requests (step 318). The agent program obtains the operating system level by querying the known data gathering function associated with the operating system. The agent program obtains the virtual host information by accessing HTTP.conf or other configuration files for the web server. The agent program obtains the IP addresses by querying a netstat, ifconfig, or ipconfig or other function which looks at the operating system's network configuration and extracts the necessary information.

If the server being queried by the respective agent program is an application server (decision 320), then the agent program gathers the following server information: operating system level, virtual host information, IP addresses for URLs for applications within server that are addressed by incoming requests (step 328). The agent program obtains the operating system level by querying the known data gathering function associated with the operating system. The agent program obtains the virtual host information by accessing HTTP.com or other configuration files for the web server. The agent program obtains the IP addresses by querying a netstat, ifconfig, or ipconfig or other function which obtains the network information from the operating system.

If the server being queried by the respective agent program is a database server (decision 330), then the agent program gathers the following server information: type of database server (such as DB2, Oracle, etc.), identities and listening port of database instances, IP addresses of hosted ports and (i.e. authorized user name/password or authorized partner IP addresses) for each database instance (step 338). The agent program obtains the identities and listening ports of the database instances by accessing files which contain this information. For example, the listening port information may be stored in an /etc/services file. The information for the identity information may be stored in the /etc/services file and/or an orahosts file for an Oracle database. The agent program obtains the hosted port IP addresses by querying the database itself. The agent program obtains the connectivity information by querying the database itself.

After the information is collected in steps 318, 328 and 338, the respective agent programs 550, 552, 554, 560, 562, 564, 572, 574, 576, 578, 580, 582, 584, 592 and 594 send the data to program 110 to generate the application support documents (i.e. application overview diagrams, server configuration documents and trouble shooting documents) and record other data as well (step 340). As explained below, change and problem notification system 600 uses the update information collected by program 110, application support documents and other data stored in data repository 240 to identify servers and applications affected by updates to computer program, and notify the owners of these servers and applications.

Figure 4:
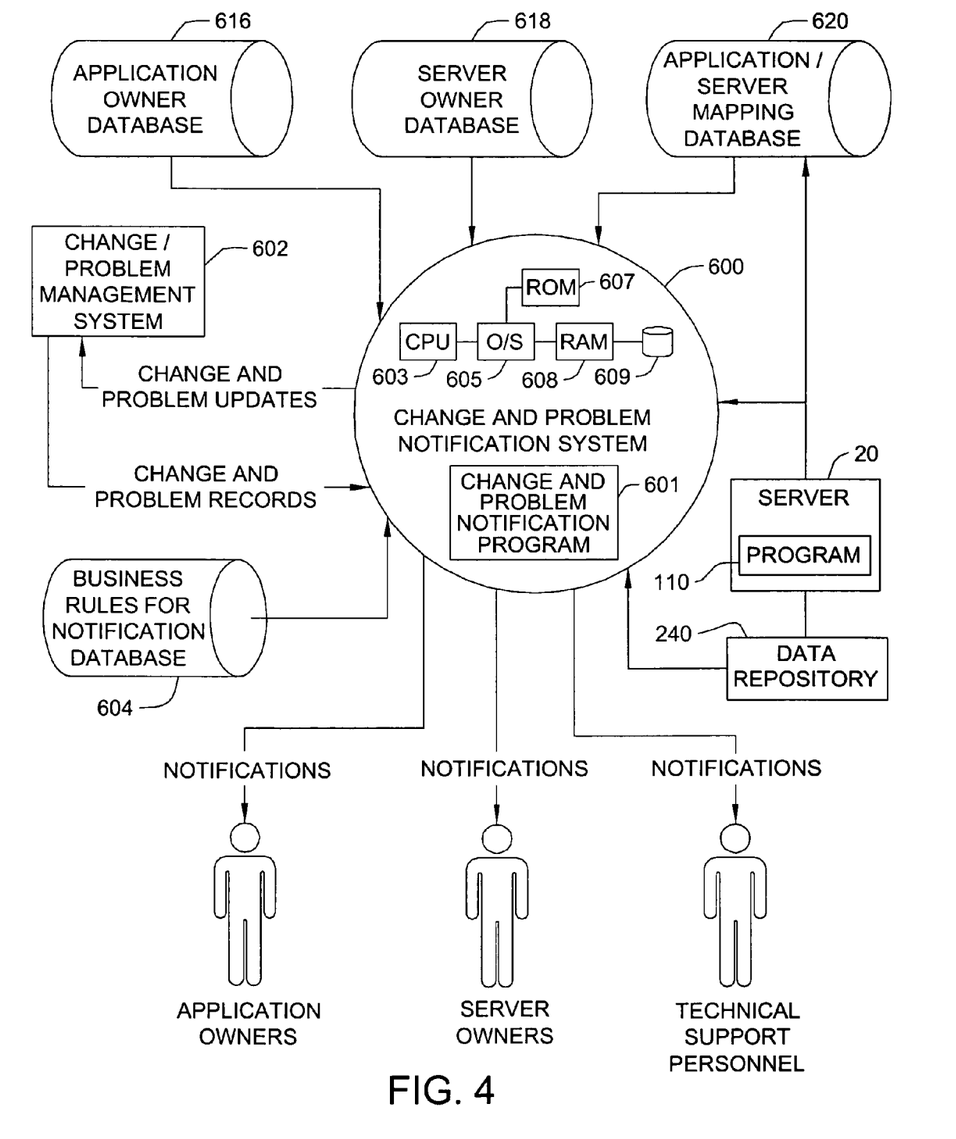
FIG. 4 is a more detailed block diagram of the change and problem notification system of FIG. 1.

FIG. 4 illustrates change and problem notification system 600 in more detail. System 600 comprises a change and problem notification program 601 and server hardware, i.e. a CPU 603, operating system 605, RAM 607, ROM 608 and storage 609. System 600 also comprises rules 604 for filtering a list of potentially affected servers and applications (and their owners) to a subset of more likely affected servers and applications or a subset of potentially affected servers and applications who have owners that are interested in the change, to reduce unnecessary notifications of changes. System 600 also comprises databases 616, 618 and 620. Database 616 lists "owners" of respective applications, and database 618 lists "owners" of respective servers. The "owners" of the applications or servers are the people responsible for administering and/or managing changes to the applications or servers, in response to changes to related programs or for general maintenance. Database 620 lists which applications reside on or make use of which servers. For example, database 620 lists that an application 664 utilizes servers 64, 72, 74, 76 and 78. Database 620 also lists that an application 662 utilizes servers 62, 72, 74, 76 and 78. (Program 100 supplied the information for database 620 from data repository 240.) Change and problem notification system 600 utilizes a known change/problem management system 602 to record changes to applications entered by an administrator. As explained in more detail below, system 600 uses the change information from the change records in change/problem management system 602, configuration information obtained from program 110 (stored in database 240) and information in databases 616, 618 and 620 to identify owners/people that are potentially interested in a change to a computer program in distributed computer system 10. System 600 uses the filtering rules in database 604 to determine which of the potentially interested owners/people should actually receive notification of the change.

Figure 5:
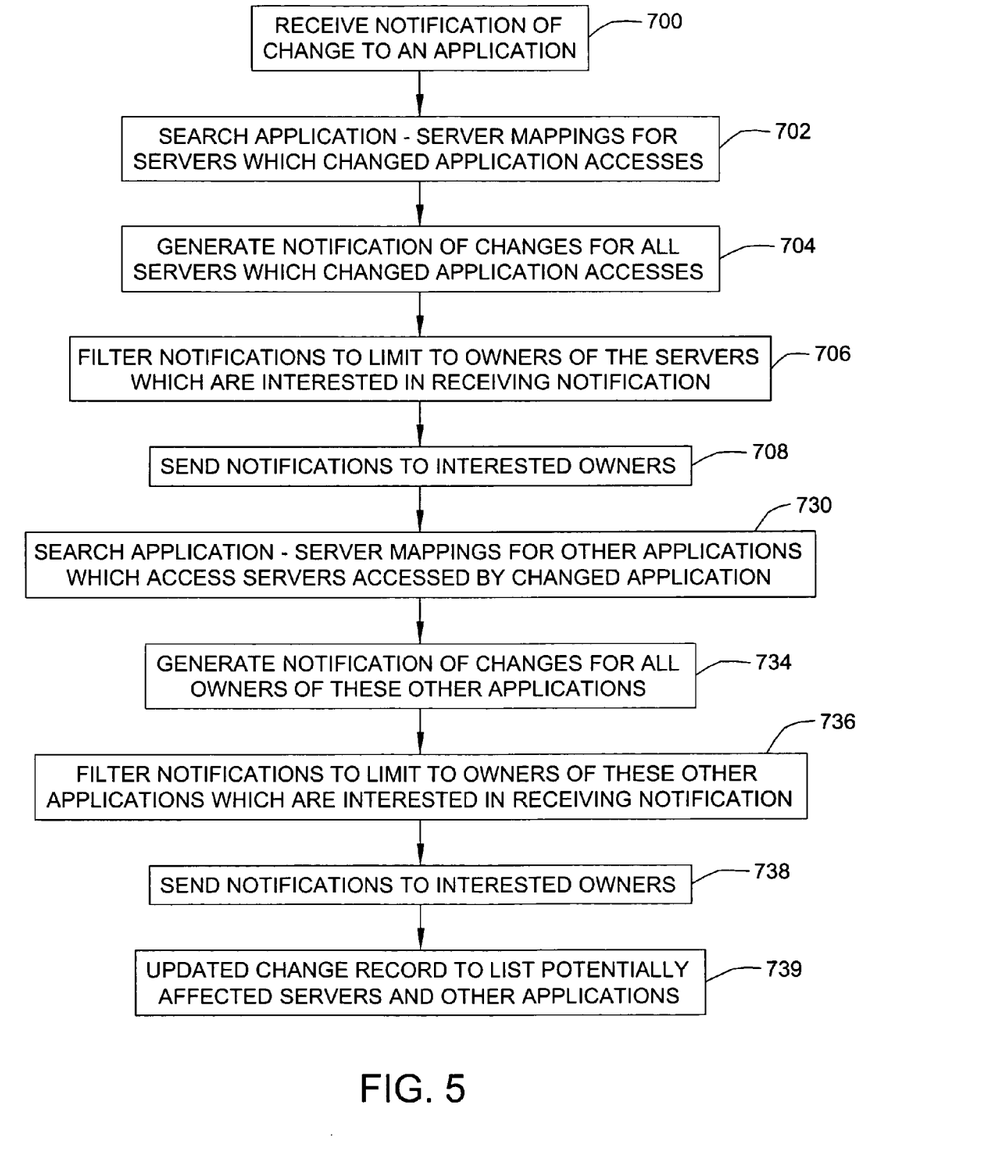
FIG. 5 is a flow chart of programming within the change and problem notification system to process and make notifications for, a change to an application in one server which may affect other servers, based on one type of change record.

FIG. 5 illustrates operation of change and problem notification system 600 in more detail, when an administrator has made an update or other change to an application in one of the servers 52,54, 62,64, 72,74,76,78, 82,84, or 92,94, and the administrator has recorded the name of the changed application as a change record. (Typically, the administrator makes the update or other change to an existing program by loading a new program file to replace all or part of the existing program.) In step 700, change and problem notification program 601 detects the change to the application from the new change record in Change and Problem Management System 602. Program 601 detects the change in a variety of ways, such as (a) a change in a predetermined field (such as "application name") in a change record entered by an administrator where the updated application has the same name, a new name which references the previous name, or the same name with a later version number, or (b) a text search for a matching or similar application name which is performed against the entire change record. Alternately, program 601 can query a configuration file in each of the servers owned by the enterprise; the configuration files list the applications which are currently installed in the server. Program 601 would then compare the current list of applications to the list of applications identified in the previous query to detect changes to previous application names (including addition of new applications) or changes to a version number of a previous application name. For purposes of explanation, assume that an administrator has scheduled a change to a web application 664 to be performed on server 64, generating a change record. After detecting the change to application 664, program 601 queries database 620 to determine which servers are used/accessed by application 664 (step 702). These servers are some of the servers which are potentially affected by the change to application 664. In the illustrated example of distributed computer system 10, servers 72, 74, 76 and 78 are database servers, and application 664 accesses files managed by database servers 72, 74, 76 and 78. For example, a user requests a web page from web application 664 (for example, an interface to a service provided by web application 664) and in response, web application 664 requests the web page from one of the servers 72, 74, 76 or 78. A change to web application 664 can affect load on servers 72, 74, 76 or 78 or other aspects of servers 72, 74, 76 or 78. For example, if the change to web application 664 is a new user function which will result in many, time consuming searches through the databases managed by servers 72, 74, 76 and 78, this will result in significant additional load on servers 72, 74, 76 and 78. Thus, servers 72, 74, 76 and 78 are potentially affected (as well as any other applications in other servers that use servers 72, 74, 76 and 78 to obtain data, as described below with reference to step 730). Next, program 601 generates and records a notification that can be sent to the owners of potentially affected servers 72, 74, 76 and 78 (step 704). (If the notification is not sent, in accordance with the rules in database 604, the record is nevertheless maintained for some period of time for audit purposes.) Next, program 601 filters the list of potentially affected servers 72, 74, 76 and 78 and their owners, based on the rules in database 604 to determine to whom to send notification of the change to application 664 (step 706). These rules can include the following:

(a) Whether the owners of respective servers 72, 74, 76 and 78 want to be notified of a change to any application that uses respective servers 72, 74, 76 or 78.

(b) Whether the owners of respective servers 72, 74, 76 and 78 want to be notified of a change to only specified applications that use respective servers 72, 74, 76 or 78.

(c) How owners of respective servers 72, 74, 76, and 78 wish to receive notifications (via one or more methods such as e-mail, text page, mobile phone text message, text to speech voice mail, fax, etc.)

(d) When owners of respective servers 72, 74, 76, and 78 wish to receive notifications (such as business hours only, all hours except late nights, or 24×7).

(e) Whether the owners of respective servers 72, 74, 76, and 78 want to be notified of only specific types of changes (such as new code function only, code and configuration changes only, or all changes).

(f) What information from change tickets the owners of respective servers 72, 74, 76, and 78 wish to receive beyond the standard information sent in all notifications (such as the duration of the change, the problem number of any problems which prompted the change, the technical team or team member scheduled to perform the change, or the assessed risk of the change)

After filtering the list of potentially affected servers to identify the potentially affected servers having owners who are interested in notification of the change to program 664, program 601 sends the notifications to these owners (step 706), either immediately or at the first available time that corresponds with the filtering rules. The notification identifies the number of the change record, the application which is to be changed, the owner of that application, the nature of the change, the date and time of the change, and any additional information in the change record that is noted in the filter rules (f) (step 706). In the illustrated configuration of distributed computer system 10, the owners of all servers 72, 74, 76 and 78 have previously recorded an interest in notification of a change to any program which uses their server, in this example, servers 72, 74, 76 or 78, so program 601 notifies the owners of servers 72, 74, 76 and 78 of the change to application 664.

Next, program 601 proceeds to identify any other potentially affected applications (and optionally, the servers where they execute) and their owners. Accordingly, for each of the servers identified in step 702 (for example, servers 72, 74, 76 and 78) as potentially affected, program 601 queries database 620 to identify other applications in other servers that use the servers identified in step 702 (for example, servers 72, 74, 76 or 78) (step 730). In the illustrated example, an application 662 on server 62 uses servers 72, 74, 76 and 78. Application 662 can be another web application or a different type of application that needs data in databases managed by servers 72, 74, 76 and 78. Consequently, program 601 identifies application 662 as potentially affected by the change to program 664. In the example noted above where a new user function is added to application 664 that will burden servers 72, 74, 76 and 78, this will impact response time to application 662 when attempting to access data managed by servers 72, 74, 76 and 78. Consequently, the owner of application 662 (and optionally, server 62) may want to be notified of the change to application 664. Next, program 601 generates and records a notification that can be sent to the owner of application 662 (and optionally, server 62) (step 734). (If the notification is not sent, in accordance with the rules in database 604, the record is nevertheless maintained for some period of time for audit purposes.) Next, program 601 filters the list of potentially affected applications (and optionally, servers), in this example, application 662 (and optionally, server 62) and its owner, based on the rules in database 604 (step 736). These rules can include the following:

(a) Whether the owner of application 662 (and optionally, server 62) wants to be notified of a change to any other application that uses servers also used by application 662 (in this case servers 72, 74, 76 or 78).

(b) Whether the owner of application 662 (and optionally, server 62) wants to be notified of a change to only specified other applications that use servers also used by application 662 (in this case servers 72, 74, 76 or 78).

(c) How the owner of application 662 (and optionally, server 62) wishes to receive notifications (via one or more methods such as e-mail, text page, mobile phone text message, text to speech voice mail, fax, etc.)

(d) When the owner of application 662 (and optionally, server 62) wishes to receive notifications (such as business hours only, all hours except late nights, or 24×7).

(e) Whether the owner of application 662 (and optionally, server 62) wishes to be notified of only specific types of changes affecting other applications that use servers also used by application 662 (such as new code function only, code and configuration changes only, or all changes).

(f) What information from change tickets the owner of application 662 (and optionally, server 62) wishes to receive beyond the standard information sent in all notifications (such as the duration of the change, the problem number of any problems which prompted the change, the technical team or team member scheduled to perform the change, or the assessed risk of the change).

After filtering the,list of potentially affected applications (and optionally, servers) (in this example, application 662 and optionally, server 62) to identify the owners of the potentially affected applications (and optionally, servers) that want to be notified of changes to other applications that use the same servers, program 601 sends the notifications to these owners, of the change to program 664 (step 736), either immediately or at the first available time that corresponds with the filtering rules. The notification identifies the number of the change record, the application which is to be changed, the owner of that application, the nature of the change, the date and time of the change, and any additional information in the change record that is noted in the filter rules (f) (step 736). In the illustrated configuration of distributed computer system 10, the owner of application 662 (and optionally, server 62) has previously recorded an interest in notification of a change to any other program which uses the same server as application 662, in the foregoing example, servers 72, 74, 76 or 78. Consequently, program 601 notifies the owner of application 662 (and optionally, server 62) of the change to application 664 (step 738). Finally, program 601 updates the change record with a list of the potentially affected applications and servers (step 739).

Figure 6:
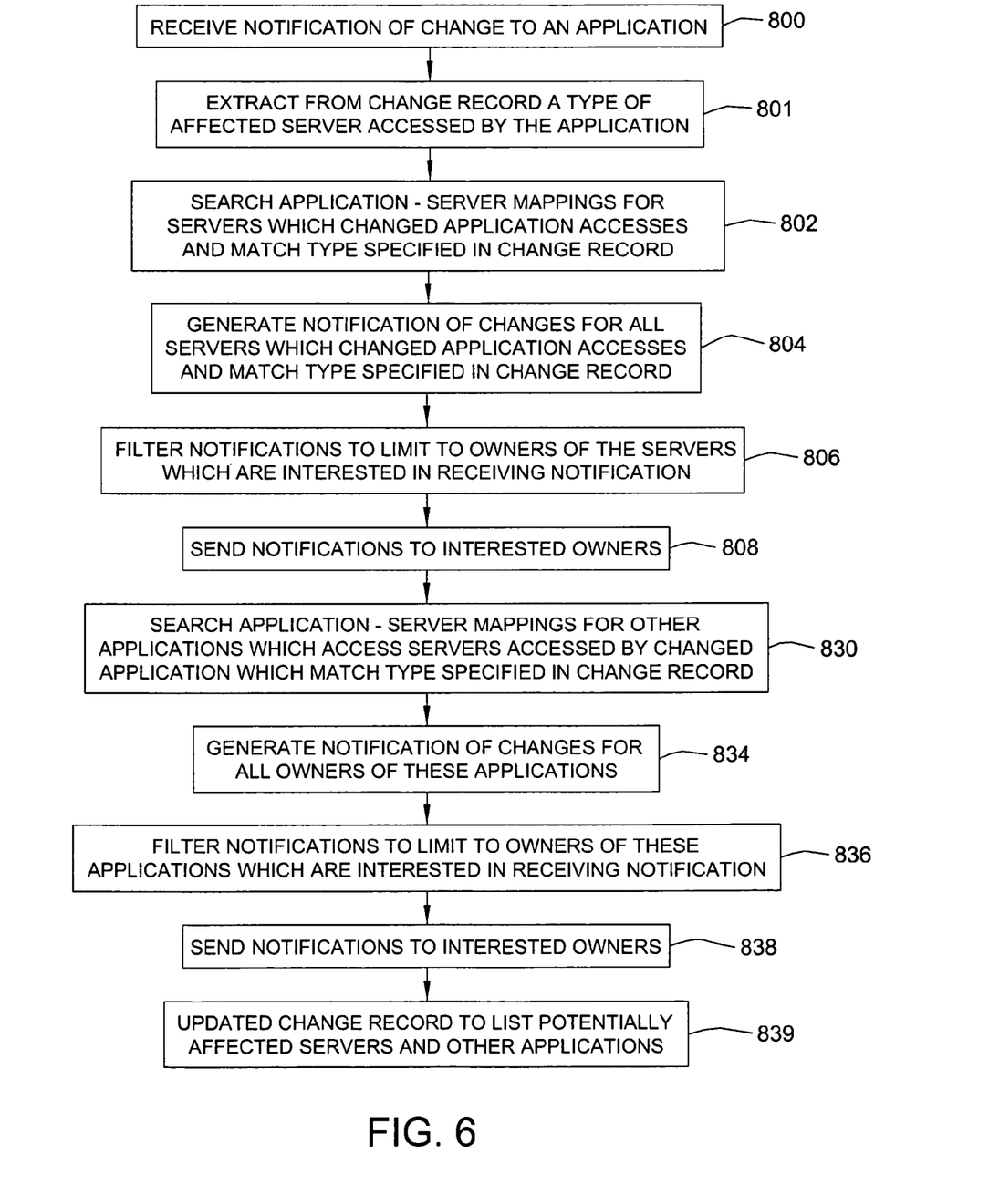
FIG. 6 is a flow chart of other programming within the change and problem notification system to process and make notifications for, a change to an application in one server which may affect other servers, based on a more detailed type of change record.

FIG. 6 illustrates operation of change and problem notification system 600 in more detail, when an update or other change is made to an application in one of the servers 52, 54, 62, 64, 72, 74, 76, 78, 82, 84, or 92, 94, and a change record identifies the application (in a server) which has changed and a type of other server, used by the application, which server will be impacted by the change to the application. For example, the change record indicates that application 664 is scheduled to be changed and that only an IBM DB2 type of database server will be impacted. For example, the change to application 664 is a new user function that is only available for searching DB2 databases, and not for searching other types of databases. By way of example, servers 72 and 74 have a DB2 database manager, but servers 76 and 78 have an Oracle database manager and do not have a DB2 database manager. Consequently, the more detailed change records typically limit the number owners that need to be notified of the change, as follows.

An administrator has scheduled an update or other change to an application in one of the servers 52, 54, 62, 64, 72, 74, 76, 78, 82, 84, or 92,94, and the administrator has recorded the name of the changed application and the type of affected server accessed by the changed application, as a change record. (Typically, the administrator makes the update or other change to an existing program by loading a new program file to replace all or part of the existing program.) In step 800, change and problem notification program 601 detects the change from the new change record in repository 240. Program 601 detects the change in a variety of ways, such as (a) a change in a predetermined field (such as "application name") in a change record entered by an administrator where the updated application has the same name, a new name which references the old name, or the same name with a later version number, or (b) a text search for a matching or similar application names which is performed against the entire change record. Alternately, program 601 can query a configuration file in each of the servers owned by the enterprise; the configuration files list the applications which are currently installed in the server. Program 601 would then compare the current list of applications to the list of applications identified in the previous query to detect changes to previous application names (including addition of new applications) or changes to a version number of a previous application name. For purposes of explanation, assume that an administrator has changed web application 664 in server 64. Program 601 also reads from the change record the type of server which is used by application 664 and will be impacted by the change to application 664 (step 801). After detecting the change to application 664 and the type of impacted server, program 601 queries database 620 to determine which servers are used/accessed by application 664 and are the type specified in the change record (step 802). These server(s) are some of the servers which are potentially affected by the change to application 664. In the illustrated example of distributed computer system 10, application 664 accesses files managed by database servers 72, 74, 76 and 78. For example, a user requests a web page from web application 664 (for example, an interface to a service provided by web application 664) and in response, web application 664 requests the web page from one of the servers 72, 74, 76 or 78. A change to web application 664 can affect load on servers 72, 74, 76 or 78 or other aspect of servers 72, 74, 76 or 78. However, only servers 72 and 74 are DB2 database servers. For example, the change to web application 664 is a new user function which will result in many, time-consuming searches through a DB2 databases managed by servers 72 and 74, and this will result in additional load on servers 72 and 74. However, the new user function will not result in additional searches through servers 76 or 78 or otherwise impact servers 76 or 78 because servers 76 and 78 do not have a DB2 database manager. Thus, servers 72 and 74 are potentially affected (as well as any other applications in other servers that use servers 72 and 74 to obtain data, as described below with reference to step 830). Next, program 601 generates and records a notification that can be sent to the owners of potentially affected servers 72 and 74 (step 804). (If the notification is not sent, in accordance with the rules in database 604, the record is nevertheless maintained for some period of time for audit purposes.) Next, program 601 filters the list of potentially affected servers 72 and 74 and their owners, based on the rules in database 604 to identify which of the potentially affected servers have owners which are interested in the change to program 664 (step 806). These rules can include the following:

(a) Whether the owners of respective servers 72 and 74 want to be notified of a change to any application that uses respective servers 72 and 74.

(b) Whether the owners of respective servers 72 and 74 want to be notified of a change to only specified applications that use respective servers 72 and 74.

(c) How owners of respective servers 72 and 74 wish to receive notifications (via one or more methods such as e-mail, text page, mobile phone text message, text to speech voice mail, fax, etc.)

(d) When owners of respective servers 72 and 74 wish to receive notifications (such as business hours only, all hours except late nights, or 24×7).

(e) Whether the owners of respective servers 72 and 74 want to be notified of only specific types of changes (such as new code function only, code and configuration changes only, or all changes).

(f) What information from change tickets the owners of respective servers 72 and 74 wish to receive beyond the standard information sent in all notifications (such as the duration of the change, the problem number of any problems which prompted the change, the technical team or team member scheduled to perform the change, or the assessed risk of the change).

After filtering the list of potentially affected servers to identify the owners of the potentially affected servers that want to be notified of changes to applications that use the potentially affected servers, program 601 sends the notifications to these owners, of the change to program 664, including the nature of the change (step 808). In the illustrated configuration of distributed computer system 10, the owners of all servers 72 and 74 have previously recorded an interest in notification of a change to any program which uses their server, in this example, servers 72 and 74. Consequently, program 601 notifies the owners of servers 72 and 74 of the change to application 664 (step 808).

Next, program 601 proceeds to identify any other potentially affected applications (and optionally, servers as well) and their owners, as follows. For each of the servers identified in step 802 (for example, servers 72 and 74) as potentially affected, program 601 queries database 620 to identify other applications in other servers that use the servers identified in step 702 (for example, servers 72 and 74) (step 830). In the illustrated example, an application 662 on server 62 uses servers 72 and 74. Application 662 can be another web application or a different type of application that needs data in databases managed by servers 72 and 74. Consequently, application 662 is potentially affected by the change to program 664. In the example noted above where a new user function is added to application 664 that will burden servers 72 and 74, this will impact response time to application 662 when attempting to access data managed by servers 72 and 74. Consequently, the owner of application 662 (and optionally, server 62) may want to be notified of the change to application 664. Next, program 601 generates and records a notification that can be sent to the owner of application 662 (and optionally, server 62) (step 834). (If the notification is not sent, in accordance with the rules in database 604, the record is nevertheless maintained for some period of time for audit purposes.) Next, program 601 filters the list of potentially affected applications (and optionally, servers), in this example, application 662 (and optionally, server 62) and its owner, based on the rules in database 604 (step 836). These rules can include the following:

(a) Whether the owner of application 662 (and optionally, server 62) wants to be notified of a change to any other application that uses servers also used by application 662 (in this case servers 72 or 74).

(b) Whether the owner of application 662 (and optionally, server 62) wants to be notified of a change to only specified other applications that use servers also used by application 662 (in this case servers 72 or 74).

(c) How the owner of application 662 (and optionally, server 62) wishes to receive notifications (via one or more methods such as e-mail, text page, mobile phone text message, text to speech voice mail, fax, etc.)

(d) When the owner of application 662 (and optionally, server 62) wishes to receive notifications (such as business hours only, all hours except late nights, or 24×7).

(e) Whether the owner of application 662 (and optionally, server 62) wishes to be notified of only specific types of changes affecting other applications that use servers also used by application 662 (such as new code function only, code and configuration changes only, or all changes).

(f) What information from change tickets the owner of application 662 (and optionally, server 62) wishes to receive beyond the standard information sent in all notifications (such as the duration of the change, the problem number of any problems which prompted the change, the technical team or team member scheduled to perform the change, or the assessed risk of the change)

After filtering the list of potentially affected applications (and optionally, servers) (in this example, application 662 and optionally, server 62) to identify the owners of the potentially affected application(s) (and optionally, server(s)) that want to be notified of changes to other applications that use the same servers as the potentially affected applications, program 601 sends the notifications to these owner(s), of the change to program 664, including the nature of the change (step 838). In the illustrated configuration of distributed computer system 10, the owner of application 662 (and optionally, server 62) has previously recorded an interest in notification of a change to any program which uses the same server as application 662, in the foregoing example, servers 72 and 74, so program 601 notifies the owner of application 662 (and optionally, server 62) of the change to application 664 in step 838. Finally, program 601 updates the change record with a list of the potentially affected applications and servers (step 839).

Program 601 can be loaded into computer 600 from a computer readable medium such as magnetic tape or disk, optical disk, DVD, etc. or downloaded from network media via a TCP/IP adapter card.

Based on the foregoing, system, method and program for notifying owners of applications and servers of changes to applications have been disclosed. However, numerous modifications and substitutions can be made without deviating from the scope of the present invention. For example, alternative formats and transmission protocols for change records, new software products and the detection of new relationships between applications and servers, or new or alternative methods of delivering notification to application and server owners can be used. Therefore, the present invention has been disclosed by way of illustration and not limitation, and reference should be made to the following claims to determine the scope of the present invention.

What is claimed is:

1. A computer implemented method for managing a change to a computer program in a computer system, said method comprising the steps of:
  receiving notification of a changed computer program in said computer system;
  determining, by automatically querying configuration files of said changed computer program, one or more first servers which said changed computer program accesses to perform one or more functions, wherein said querying is performed by running one or more agent programs in said one or more first servers, and wherein said determining of said one or more first servers which said changed computer program accesses includes determining a type of operating system utilized by said one or more first servers;
  determining one or more other computer programs in one or more other servers which access said one or more first servers, wherein said determining of said one or more computer programs in said one or more other servers is performed by running one or more other agent programs in said one or more other servers that automatically query configuration files of said changed computer program, and wherein said determining of said one or more computer programs in said one or more other servers which access said one or more first servers includes determining a type of operating system utilized by said one or more other servers; and
  generating a notification of said changed computer program to one or more interested owners of said one or more first servers and said one or more other servers determined to access said changed computer program in said computer system.

2. The computer implemented method as set forth in claim 1, wherein said generating a notification step further comprises the step of:
  filtering a list of potentially affected servers to identify a subset of potentially affected servers having one or more owners who have recorded an interest in receiving notification of said change to said computer program in said computer system.

3. The computer implemented method as set forth in claim 2, further comprising the step of:
  sending said notification of said changed computer program to said one or more owners of said subset of potentially affected servers who have recorded an interest in receiving said notification of said changed computer program in said computer system.

4. The computer implemented method as set forth in claim 1, wherein said determining a type of operating system further comprises:
  querying, using a known data gathering program function, a file stored within a respective server to identify a respective operating system running on said respective type of server.

5. The computer implemented method as set forth in claim 1, further comprising:
  determining a type of server running said type of operating system determined, wherein said type of server comprises at least one of: a web server, an application server, a middleware server, a database server and a load balancing server.

6. A computer program product for managing a change to a computer program in a computer system, said computer program product comprising:
  a computer-readable storage device;
  first program instructions to determine, by automatically querying configuration files of said changed computer program in said computer system, one or more first servers which said changed computer program accesses to perform one or more functions, wherein said first instructions include instructions to run one or more agent programs in said one or more first servers to automatically query said configuration files of said changed computer program, and wherein said first instructions include instructions to determine a type of operating system utilized by said one or more first servers;

second program instructions to determine one or more other computer programs in one or more other servers which access said one or more first servers, wherein said second instructions include instructions to run one or more other agent programs in said one or more other servers to automatically query configuration files of said changed computer program, and wherein said second instructions include instructions to determine a type of operating system utilized by said one or more other servers; and third program instructions to generate a notification of said changed computer program to one or more interested owners of said one or more first servers and said one or more other servers determined to access said changed computer program in said computer system; and wherein said first, second and third program instructions are stored on said computer-readable storage device.

7. The computer program product as set forth in claim 6, further comprising:

fourth program instructions to filter a list of potentially affected servers to identify a subset of potentially affected servers having one or more owners who have recorded an interest in receiving notification of said changed computer program in said computer system; and wherein said fourth program instructions are stored on said media in functional form.

8. The computer program product as set forth in claim 7, wherein said first program instructions include instructions to query, using a known data gathering program function in said computer system, a file stored within a respective server to identify a respective operating system running on a respective type of server specified by said respective owner interested in receiving notification of said changed computer program accessed by said respective type of server, and wherein said type of server comprises at least one of: a web server, an application server, a middleware server, a database server and a load balancing server.

9. The computer program product as set forth in claim 6, wherein said second program instructions include instructions to query, using a known data gathering program function, a file stored within a respective other server to identify a respective operating system running on said respective type of server specified by said respective owner interested in receiving notification of said changed computer program accessed by said respective type of server.

10. The computer program product as set forth in claim 7, wherein said fourth program instructions include instructions to send said notification of said changed computer program to said one or more owners of said subset of potentially affected servers who have recorded an interest in receiving said notification of said changed computer program in said computer system.

11. A method for managing a change to a computer program, said method comprising the steps of:

automatically querying, responsive to a notification received of a changed computer program in a computer system, configuration files of one or more servers potentially affected by said changed computer program, wherein said querying is performed by running one or more agent programs in said one or more servers potentially affected and wherein said querying includes determining a type of operating system utilized by said one or more potential affected servers;

filtering a list of said one or more servers potentially affected by said changed computer program to identify a subset of potentially affected servers having one or more interested owners who have recorded an interest in receiving notification of said changed computer program in said computer system; and generating a notification of said changed computer program to said interested owners of said subset of potentially affected servers, and said one or more other servers determined to access said changed computer program in said computer system.

12. The method as set forth in claim 11, further comprising the step of:

sending said notification of said changed computer program to respective owners of said subset of potentially affected servers who have recorded an interest in receiving said notification of said changed computer program in said computer system.

13. The method as set forth in claim 12, further comprising the step of:

analyzing, using data gathered by said one or more agent programs running on a respective server, at least one file stored in a standard location within said respective server, wherein said at least one file provides indication of said type of server among said one or more servers potentially affected by said changed computer program, and wherein said type of server comprises at least one of: a web server, an application server, a middleware server, a database server and a load balancing server.

14. A distributed computer system for managing a change to a computer program, said distributed computer system comprising:

a network communications channel;

a client workstation coupled to said network communications channel via a firewall;

one or more servers coupled to said network communications channel, wherein said one or more servers handle one or more requests received from said client workstation via said network communications channel;

one or more computer programs running on said one or more servers coupled to said network communication channel;

one or more agent programs running on said one or more servers, wherein said one or more agent programs, responsive to a notification received of a changed computer program among said one or more computer programs in said distributed computer system, queries configuration files of one or more servers potentially affected by said changed computer program, and wherein said one or more agent programs, running on said one or more servers potentially affected by said changed computer program, query said one or more servers to determine a respective type of operating system utilized by a respective server of said one or more servers and wherein said one or more agent programs query said one or more servers to determine a respective type of server of said one or more servers potentially affected by said changed computer program; and a subsystem for filtering a list generated of said one or more servers potentially affected by said changed computer program to identify a subset of potentially affected servers having one or more interested owners who have recorded an interest in receiving notification of said changed computer program in said computer system, said subsystem being configured to generate a notification of said changed computer program to said one or more interested owners of said subset of potentially affected servers, generating a notification of said changed computer program to said interested owners of said subset of potentially affected servers.

15. The distributed computer system as set forth in claim 14, wherein said one or more servers comprises at least one of: a web server, an application server, a middleware server, a database server and a load balancing server.

16. The distributed computer system as set forth in claim 15, wherein said subsystem is configured to notify said one or more interested owners of said subset of potentially affected servers of said changed computer program.

* * * * *